United States Patent
Adir et al.

(10) Patent No.: US 12,549,329 B2
(45) Date of Patent: Feb. 10, 2026

(54) EFFICIENT COMPUTATION OF MATRIX DETERMINANTS UNDER FULLY HOMOMORPHIC ENCRYPTION (FHE) USING SINGLE INSTRUCTION MULTIPLE DATA (SIMD)

(71) Applicant: International Business Machines Corporation, Armonk, NY (US)

(72) Inventors: Allon Adir, Kiryat Tivon (IL); Hayim Shaul, Kfar Saba (IL); Ehud Aharoni, Kfar Saba (IL)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 18/387,042

(22) Filed: Nov. 5, 2023

(65) Prior Publication Data
US 2025/0150254 A1    May 8, 2025

(51) Int. Cl.
*H04L 9/00* (2022.01)
*H04L 9/06* (2006.01)
*G06F 7/544* (2006.01)
*G06F 17/16* (2006.01)

(52) U.S. Cl.
CPC ............ *H04L 9/008* (2013.01); *H04L 9/0618* (2013.01); *G06F 7/544* (2013.01); *G06F 17/16* (2013.01)

(58) Field of Classification Search
CPC ....... H04L 9/008; H04L 9/0618; G06F 17/16; G06F 7/544
See application file for complete search history.

(56) References Cited

U.S. PATENT DOCUMENTS

| 2019/0007196 A1* | 1/2019 | Malluhi ................ H04L 9/008 |
| 2021/0376995 A1 | 12/2021 | Ratha et al. |
| 2023/0325529 A1* | 10/2023 | Sav ..................... G06F 21/6245 726/26 |

FOREIGN PATENT DOCUMENTS

| EP | 4096148 A1 | 11/2022 |
| WO | 2022191770 A1 | 9/2022 |

OTHER PUBLICATIONS

Haoran et al., Secure Outsourced Computation of Matrix Determinant Based on Fully Homomorphic Encryption, IEEEAccess, vol. 9, 2021, 22651-22661 (Year: 2021).*

(Continued)

*Primary Examiner* — Ellen Tran
(74) *Attorney, Agent, or Firm* — Daniel M. Yeates

(57) ABSTRACT

A method, apparatus and computer program product for homomorphic computation enables secure computation of determinants of a matrix under Fully Homomorphic Encryption (FHE). According to this disclosure, encrypted data that contains the values of a matrix is received at a server. The matrix is separated into at least a first portion, and a second portion. Each portion is configured as a square. A first data vector of ciphertext is computed for the first portion, and a second data vector of ciphertext is computed for the second portion. Under FHE, determinants of the first and second data vectors are computed as Single Instruction Multiple Data (SIMD) operations to generate a set of results. The set of results are then used to compute a determinant of the matrix. The determinant may then be used for FHE-based analytics.

18 Claims, 4 Drawing Sheets

(56) References Cited

OTHER PUBLICATIONS

"Block LU Decomposition", Wikipedia, retrieved from web dated Sep. 13, 2024, 2 pages, https://en.wikipedia.org/wiki/LU_decomposition.

"Parallel Gaussian Elimination", retrieved from web dated Sep. 13, 2024, 1 page, https://cseweb.ucsd.edu/classes/fa98/cse164b/Projects/PastProjects/LU/.

"Strassen's Algorithm", retrieved from web dated Sep. 13, 2024, 9 pages, https://en.wikipedia.org/wiki/Strassen_algorithm.

Almalki et al. "New parallel algorithms for finding determinants of N×N matrices WCCIT2013", Computer and Information Technology (WCCIT), Jun. 2013, 7 pages, https://www.semanticscholar.org/paper/New-parallel-algorithms-for-finding-determinants-of-Almalki-Alzahrani/9f9a76d09bba53fcd137abbdada48354b5747607,.

Ambikasaran "Fast Direct Methods for Gaussian Processes", arXiv:1403.6015v2 [math.NA], Apr. 4, 2015, 14 pages, https://arxiv.org/pdf/1403.6015.pdf.

Beliakov et al. "A Parallel Algorithm for Calculation of Large Determinants with High Accuracy for GPUs and MPI", arXiv:1308.1536v2 [cs.DC], Aug. 8, 2013, 17 pages, https://arxiv.org/pdf/1308.1536v2.pdhttps://en.wikipedia.org/wiki/LU_decomposition, f.

Heller Dan. "A Determinant Theorem with Applications to Parallel Algorithms", SIAM Journal on Numerical Analysis, Jun. 1974, pp. 559-568 (10 pages), vol. 11, No. 3, https://www.jstor.org/stable/2156162.

Nakos et al. "Fraction-Free Algorithms for Linear and Polynomial Equations", ACM SIGSAM Bulletin, Sep. 1, 1997, pp. 11-19, vol. 31, Issue 3, https://dl.acm.org/doi/abs/10.1145/271130.271133.

Lu et al., "Using Fully Homomorphic Encryption for Statistical Analysis of Categorical, Ordinal and Numerical Data," Network and Distributed System Security Symposium; 10.14722/ndss.2017.23119; Jan. 2017.

* cited by examiner

INPUT: n x n MATRIX

OUTPUT: sum(F1(A)*F2(B)*signs(n))

INPUT: 10 x 11 MATRIX

A IS [3,11]

B IS [7,11]

F1(A)- VECTOR $V_1$[11 CHOOSE 3] OF ALL 3x3 DETERMINANTS IN A
F1(B)- VECTOR $V_2$[11 CHOOSE 7] OF ALL 7x7 DETERMINANTS IN B
FOR i=1:11
res[i]=sum($V_1$*$M_i$*$V_2$*signs(11))
WHERE $M_i$ IS [11 CHOOSE 3,11 CHOOSE 7] MATRIX
MAPPING VALUES OF $V_1$ TO SELECTED POSITIONS IN $V_2$.

EFFICIENT COMPUTATION OF MATRIX DETERMINANTS UNDER FULLY HOMOMORPHIC ENCRYPTION (FHE) USING SINGLE INSTRUCTION MULTIPLE DATA (SIMD)

BACKGROUND OF THE INVENTION

Technical Field

This disclosure relates generally to the use of homomorphic encryption operations to facilitate computing against encrypted data.

Background of the Related Art

Homomorphic Encryption (HE) is a form of encryption that allows computations to be carried out on ciphertexts, thus generating an encrypted result which, when decrypted, "matches" the result of operations performed on the plaintext. A homomorphic encryption scheme is a cryptosystem that allows computations to be performed on data without decrypting it.

The first plausible fully homomorphic encryption (FHE) scheme was introduced by Craig Gentry from IBM® Research in 2009. Until then it was not possible to perform an arbitrary amount of multiplication and addition operations on encrypted data due to the inherent growth of "noise" in the ciphertext after each compute operation, effectively reaching a point in which the ciphertext can no longer be decrypted. FHE is built on sound mathematical constructs, specifically lattice-based (e.g., Learning With Errors (LWE)) problems. These problems are universally considered difficult to solve without any known efficient algorithms to do so. Although FHE has a symmetric-key function, it is mostly used as a public key cryptography scheme, where a secret private key is used to generate public and evaluation keys that can then be shared. The introduction of a "bootstrapping" mechanism by Gentry, which cleans and reduces the amount of "noise" in the ciphertext, opened the door for the ubiquitous use of FHE in industry. Novel and more efficient schemes have been developed since its introduction, such as the fourth-generation Cheon-Kim-Kim-Song (CKKS) scheme, which is useful for floating point calculations, like those used in machine learning algorithms. Traditional encryption schemes such as AES (Advanced Encryption Standard) and RSA (Rivest-Shamir-Adelman) provide strong cryptographical guarantees on the security of data at rest and in transit, but they do not address the critical protection of data while in processing. With FHE, data always remains encrypted at rest, in transit, and during processing. In Privacy-Preserving Machine Learning (PPML), and using FHE, an AI model can be trained using data it cannot "see" to produce a model that only the users who hold the secret key(s) can decrypt and manipulate.

FHE allows for inference-as-a-service, in which a client encrypts and uploads her (private) data to a server that uses a pre-trained model to perform inference over the data. In this situation, the server is not exposed to the sensitive data, yet the client receives the resulting computed analytics, which she can decrypt. Traditionally, FHE was considered too slow compared to other privacy-preserving solutions (such as multi-party computations (MPC) or garbled circuit (GC)). In recent years, however, the run-times of FHE solutions have improved dramatically. One of the techniques that boosted FHE performance is packing multiple values into the slots of a single ciphertext. Operators applied on ciphertexts are then applied slot-wise in a single instruction multiple data (SIMD) manner. SIMD is a type of parallel processing. Unlike instructions that perform a single operation on a single data point, SIMD instructions can perform the same operation on multiple data points at once.

The computation of a determinant of a matrix involves a recursive computation of the determinants of many sub-matrixes. Computing determinants is useful, for example, for solving a set of linear equations or for computing the inverse of a matrix. Both of these use-cases occur when performing analytics under FHE, e.g. when modeling an ARIMA (Autoregressive Integrated Moving Average) time-series or a linear-regression model over encrypted data. Although techniques to compute determinants, as well as related optimizations for these techniques, have been proposed over the years, the techniques and optimizations are not suitable for FHE, mainly because they rely on conditional operations or operations that depend on values that are very hard to perform under encryption, where the manipulated values are not visible.

BRIEF SUMMARY

This disclosure leverages the properties of single instruction multiple data (SIMD), e.g., wherein addition and multiplication are performed as a single element-wise operation on pairs of vectors of values, to address the problem of computing determinants of a matrix efficiently under Fully Homomorphic Encryption (FHE). The approach enables computational efficiencies, e.g., when solving sets of linear equations or computing matrix inverses, thereby improving computational and storage efficiencies of FHE-based analytics that depend on such functions.

A computation of a determinant of a matrix involves a recursive computation of the determinants of many sub-matrixes. According to this disclosure, SIMD-based processing is exploited to compute many determinants together. The basic method is as follows. Assume there are S slots in a SIMD vector (e.g., as in an FHE ciphertext), and that it is desired to compute many determinants of c sub-matrices of size m×m (a square). If c≤s, the method creates m×m vectors/ciphertexts with n slots in each vector, where the $i^{th}$ slot of the m×m vectors hold the $i^{th}$ sub-matrix. The operations of computing the determinants on the m×m vectors are then performed as SIMD operations, and the result is a single vector containing h determinants. If (k−1) s<c≤kS, k sets of m×m vectors are used, and the above procedure is repeated on the k sets, resulting in k vectors with the output determinants. As an optimization, an entire square matrix is separated into two portions (halves), and the determinants of all the sub-matrices of the two halves are computed separately using the above-described SIMD method. In this approach, the encrypted matrix is first split into an upper half, and a lower half. Each half's multiple determinants are then computed in parallel using the multiple slots in each ciphertext. The lower half's determinant results are then ordered with respect to the upper half's determinant results so that combining the two results reduces to an inner product. These determinants are then efficiently arranged so as to compute the final determinant of the whole matrix with just 1 (or k) more SIMD products.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
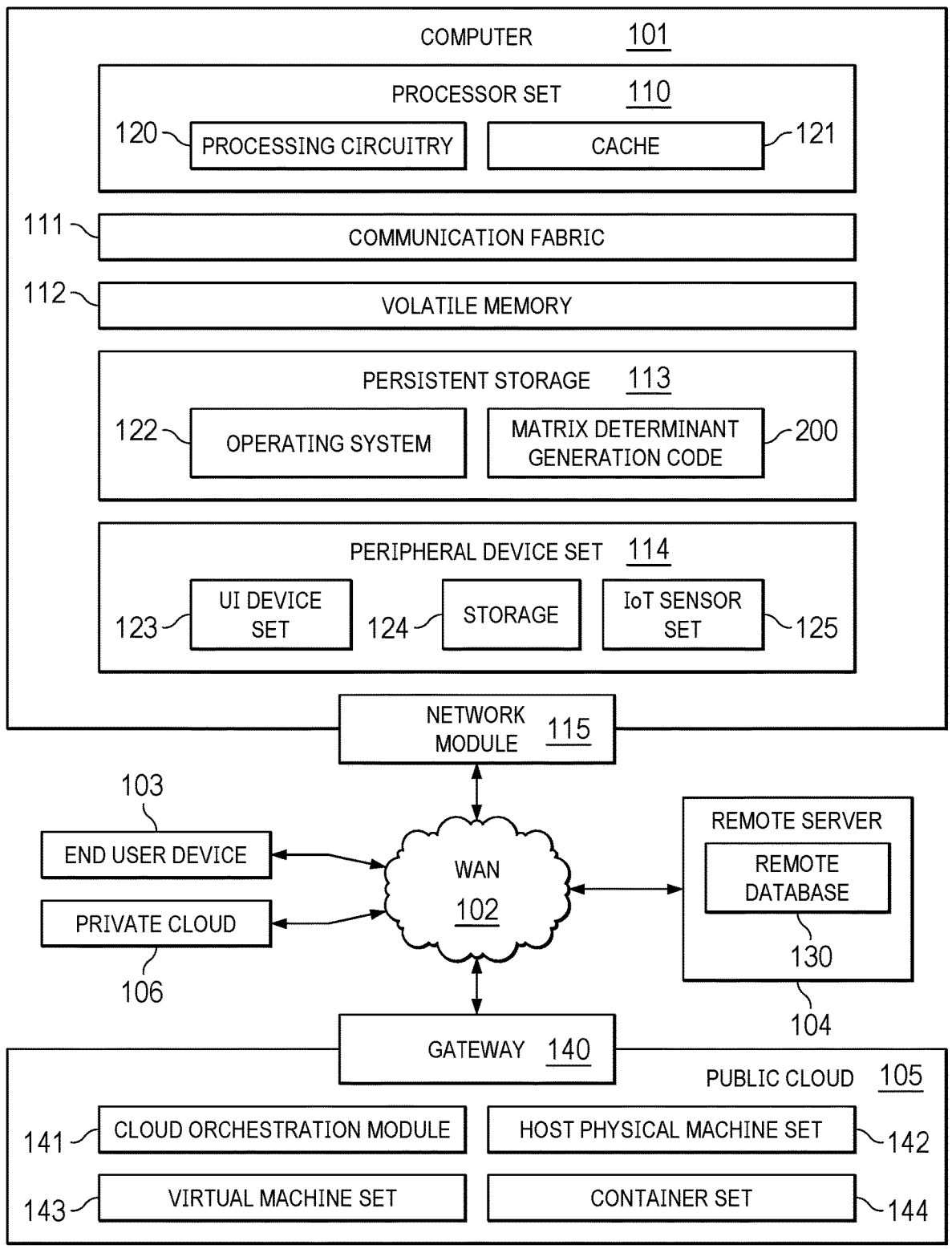
FIG. 1 depicts an exemplary block diagram of a data processing system in which exemplary aspects of the illustrative embodiments may be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the SIMD-based matrix determinant computation code 200 of this disclosure. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as Linux, various known proprietary operating systems or open source Portable Operating System Interface-type operating systems that employ a kernel. The code included in block 200 typically includes at least some of the computer code involved in performing the inventive methods.

Peripheral Device Set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Homomorphic Encryption

Homomorphic encryption (HE) is a public-key encryption scheme that in addition to the usual functions Enc, Dec (see below) also provides functions to perform operations on encrypted data (usually addition and multiplication). The encryption operation Enc: $\mathcal{R}_1 \rightarrow \mathcal{R}_2$ encrypts input plaintext from the ring $\mathcal{R}_1(+,*)$ into ciphertexts in the ring $\mathcal{R}_2(\oplus,\odot)$, and its associated decryption operation is Dec:: $\mathcal{R}_2 \rightarrow \mathcal{R}_1$.

An HE scheme is correct if for every valid input x, y $\in$ $\mathcal{R}_1$:Dec (Enc (x))=x, Dec (Enc (x)$\oplus$Enc (y))=x+y, and Dec (Enc (x)$\odot$Enc (y))=x*y, and is approximately correct (as in CKKS) if for some small $\epsilon$>0 that is determined by the key, it follows that |x−Dec (Enc (x))|≤$\epsilon$. The addition and multiplication equations are modified in the same way. For schemes that support SIMD (Single Instruction Multiple Data), additions and multiplications are applied slot-wise on vectors.

Several HE schemes have been proposed based on hardness of a computational problem known as Ring Learning with Errors (R-LWE). Prominent examples of such schemes include BFV (Brakerski/Fan-Vercauteren), BGV (Brakerski-Gentry-Vaikuntanathan), and CKKS (Cheon-Kim-Kim-Song) schemes, which schemes (named after the original proposers) are both additively and multiplicatively homomorphic. While the BFV and BGV schemes are efficient for vector operations over integers, the CKKS scheme is more appropriate for "approximate" (limited precision) floating-point operations.

Some HE schemes, such as CKKS, operate on ciphertexts in a homomorphic Single Instruction Multiple Data (SIMD) fashion. This means that a single ciphertext encrypts a fixed-size vector, and the homomorphic operations on the ciphertext are performed slot-wise on the elements of the plaintext vector. To utilize the SIMD feature, more than one input element is packed and encrypted in every ciphertext. This ciphertext packing enables parallelization of addition and multiplication operations.

More generally, homomorphic encryption enables the construction of programs for any desirable functionality, which can be run on encrypted inputs to produce an encryption of the result. Because such a program need never decrypt its inputs, it can be run by an untrusted party without revealing its inputs and internal state. Toolkits for implementing homomorphic encryption are known. A well-known toolkit is HElib, an open-source project. The current version of HElib supports addition and multiplication operations of arbitrary numbers in binary representation, using encryption of the individual bits.

Machine Learning-as-a-Service Using Homomorphic Encryption (ML Over HE)

Figures 2, 3:
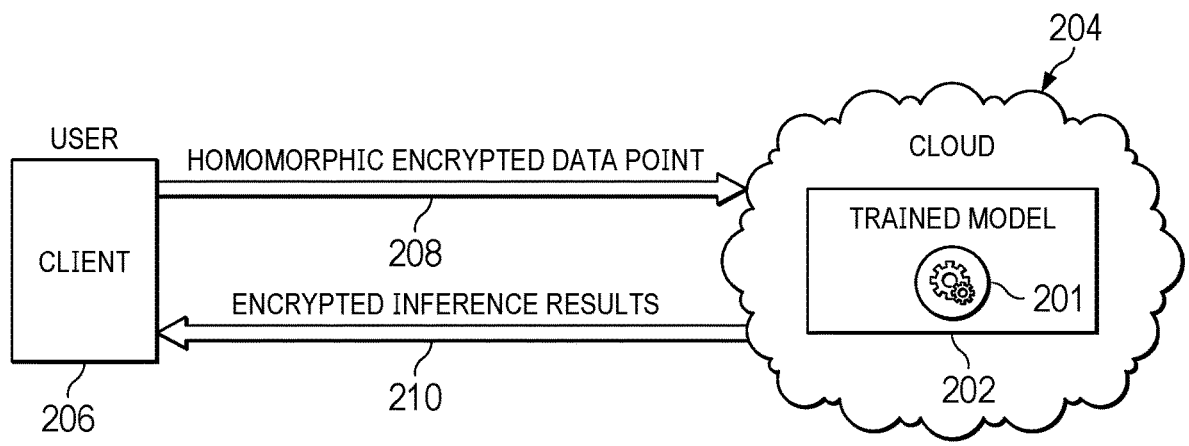
FIG. 2 is a representative Machine Learning as-a-service (MLaaS) operating environment in which the techniques of this disclosure may be implemented.
FIG. 3 depicts a representative matrix determinant computation.

With reference now to FIG. 2, a representative (but non-limiting) operating environment for the technique herein is depicted. As shown, in a typical machine learning (ML) as a service scenario, a trained model such as a linear-regression 201 is hosted on a cloud server 202 (sometimes referred to herein as Cloud) in a cloud computing infrastructure 204 such as described above. The model 201 may be exposed as an Application Programming Interface (API) on the cloud 204. In operation, and as a service, the hosting cloud server 202 allows users to run inference queries on the model 201. Typically, a user (sometimes referred to herein as Client) is associated with a client machine 206, and the client and server are configured to operate according to a client-server model. A homomorphic encryption (HE) protocol is enforced across the client-server operating environment such that the Cloud protects the model's privacy while users (Clients) maintain the privacy of their scoring data points returned by the model. In a typical request-response workflow, the client 206 sends an encrypted query 208 (e.g., a data point) to the cloud server 202, the cloud server 202 applies the model 201 and then returns a response 210. The response includes the encrypted inference results. In this manner, privacy-preserving inference problems are securely evaluated.

Thus, as depicted in FIG. 2, the Client homomorphically-encrypts its data points and shares them with the Cloud. In this example embodiment, the Cloud then uses the public key received from the Client to encrypt its trained model, e.g., a Linear-Regression model, and it homomorphically-evaluates the Linear-Regression on the encrypted data points. In a variant embodiment, the Cloud does not need to encrypt its model before using it on inference on the encrypted data point supplied by the user. This is because CKKS (and other schemes) allow computations to be performed that involve both ciphertexts (like the user's data point) and plaintexts (e.g., the Cloud's model).

Generalizing, and as described above, PPML that use HE (sometimes referred to herein as ML over HE) typically involve two entities: a user (client), and a semi-honest cloud server that performs Machine Learning (ML) computation on HE-encrypted data. The user can train a model locally, encrypt it, and upload it to the cloud. In such a case, the model architecture and its weights are not considered a secret from the user, but only from the cloud. Alternatively, the user can ask the cloud to train a model on her/her behalf over encrypted/unencrypted data and, at a later stage, perform inference operations (again, on the user's behalf) using the trained model. In some scenarios, the model is a secret and should not be revealed to the user, who receives only the classification or prediction output (the result of the inferencing). It is assumed that all communications between all entities are encrypted using a secure network protocol, e.g., TLS 1.3, that provides confidentiality and integrity, and that allows the users to authenticate the cloud server.

Fully Homomorphic Encryption (FHE) (such as enabled by the CKKS scheme described above) allows data to remain encrypted during computation, regardless of the cloud or infrastructure used to process it.

Efficient Determinant Computation and Solving Sets of Linear Equations Under FHE Using SIMD With the above as background, the following describes a FHE-based matrix determinant computation technique of this disclosure. As noted, the technique leverages the properties of single instruction multiple data (SIMD), e.g., wherein addition and multiplication are performed as a single element-wise operation on pairs of vectors of values, to solve the problem of computing determinants of a matrix efficiently under homomorphic encryption.

FIG. 3 depicts how a determinant of a matrix is computed. The determinant of a matrix is a single numeral value. Formally, the determinant of a matrix A is denoted |A| or det (A), and it is a scalar value that is only defined for square matrices. FIG. 3 depicts the determinant computation for a representative matrix 300, in this case a "3×3" square matrix. In particular, and for each element 302 in the top row of the matrix, the row and column it belongs to are blocked out, thus leaving an uncovered 2×2 sub-matrix 304. The determinant of the 2×2 sub-matrix 304 is then computed (e.g., for element $a_{11}$, compute $a_{22}*a_{33}-a_{23}*a_{32}$), and the result is then multiplied by the associated element 302 to generate a value for this sub-matrix. The determinant for the matrix 300 as a whole is then the sum of those individual values, alternating addition and subtraction.

As noted above, in a FHE operating scenario such as depicted in FIG. 2, a server only receives encrypted data. According to this disclosure, when the server receives a matrix whose values are encrypted and stored within ciphertexts, and it is desired to compute the determinant of that matrix, the technique of this disclosure is leveraged. As mentioned, the technique leverages SIMD processing to generate the determinant in a computationally-efficient manner. The notion of a "server" here is not intended to be limiting. Generalizing, a server on which the FHE-based matrix determinant computation technique is executed may be a conventional server, a cloud, an agent that is a component of a hardware accelerator that does the computation, another client (in a peer-to-peer configuration), any other mechanism or function that performs computations on a server's behalf, or the like.

Figure 4:
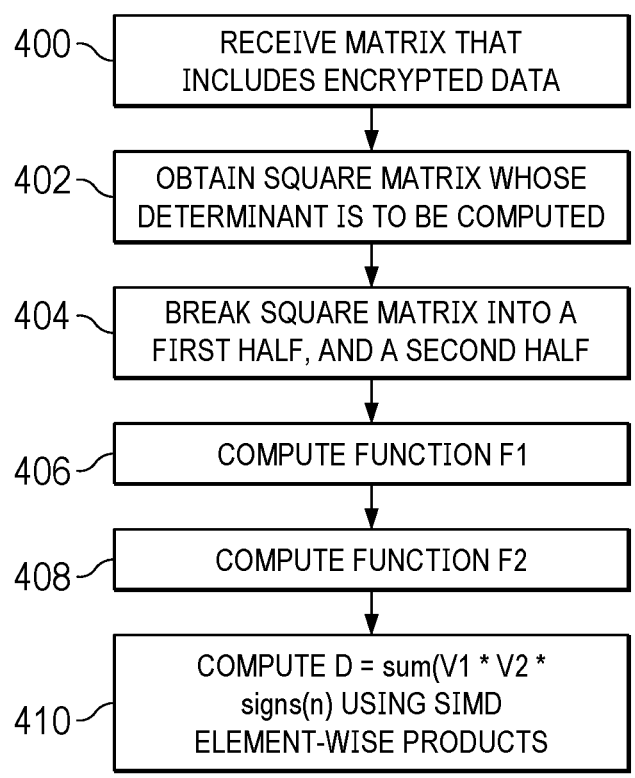
FIG. 4 depicts a process flow of an FHE-based matrix determinant computation according to this disclosure.

The technique of this disclosure for SIMD-based computing of a matrix determinant under FHE is depicted in the high-level process flow of FIG. 4. The process begins at step 400 upon receipt (e.g., at a server running an FHE scheme) of encrypted data that contains the values of a matrix (i.e., the matrix values are stored encrypted in ciphertexts). The received matrix may or may not be a square matrix. Because a determinant can only be computed from a square matrix, the high level process begins at step 402 with an assumption that the determinant of a square matrix n×n needs to be computed. This may be the received matrix itself, or some portion of the matrix received at step 400. At step 404, the square matrix is broken into two (2) portions, e.g., an upper half H1, and a lower half H2, wherein each of the halves are of size m×n, where m=n/2. At step 406, a first function F1 is computed. In particular, F1 (H=m×n matrix)=a vector V of length "n choose m"=C (n, m)=n!/[m!*(n−m)!] that correspond to the C(n,m) determinants of the C(n,m) different sub-matrices of size (m×m) of H. This correspondence is according to some determined order O, e.g., a lexicographic order of the indices of the columns of the sub-matrices. Function F1 creates $m^2$ ciphertexts, wherein the $i^{th}$ slot in the $m^2$ ciphertexts contain together all the elements of the $i^{th}$ m×m sub-matrix of the input, where the sub-matrices are ordered by O. The output vector V[i] of length "n choose m" is the $i^{th}$ determinant in the aforementioned ordering O. At step 408, a second function F2 is computed. Function F2 (H=m×n matrix) is just like F1 except that the C (n, m) entries of the output vector V correspond to the C(n,m) different sub-matrices of size (m×m) of H where the correspondence is according to an order O', where the sub-matrix with columns $a_1, a_2, \ldots a_m$ is in position i in the order O' if the sub-matrix with the remaining m columns after removing $a_1, a_2, \ldots a_m$ from the set of all n columns is in position i in order O. For example, if O is a lexicographical ordering of the indices of the columns in the sub-matrix, then O' is a lexicographical ordering of the columns that are not in the sub-matrix. Function F2 creates $m^2$ ciphertexts, wherein the $i^{th}$ slot in the $m^2$ ciphertexts contain together all the elements of the $i^{th}$ m×m sub-matrix of the input, wherein the matrices are ordered by O'. For F2, the output vector V[i] is the same as F1, except that the m-tuples are ordered by O'. Steps 406 and 408 may be carried out sequentially or concurrently.

The rationale behind the above-described definitions (for the functions F1 and F2) is that the determinant in the $i^{th}$ entry in F1 is of some sub-matrix $m_1$ when the matching $i^{th}$ entry in F2 is the determinant of the sub-matrix $m_2$ that needs to be multiplied with the determinant of $m_1$ in the term that needs to be added to the determinant of the full matrix (up to sign). As will be described below, the determinant of the square matrix is based on these functions, together with a vector signs (n) of C (n,m) values, wherein signs (n) [i]=either −1 or +1, according to the sign that F1(H1)[i]*F2 (H2) [i] needs to contribute to the final determinant. Preferably, F1 and F2 use known methods of computing determinants of sub-matrices in a way that avoids re-computing determinants of smaller common sub-matrices (minors). For example, the process may start by computing and caching small minors at the bottom of the matrix and continuing recursively with larger minors, always using the cached minors, and then dropping them and caching the new larger minors. This is not a limitation. Further, the above-described method can be generalized to having halves of different sizes. The top half can have $m_{up}$ rows, and the bottom half $m_{down}$ rows, such that $m_{up}+m_{down}=n$. The method works in the same way as described above based on the observation that $C(n, m_{up})=C(n, m_{down})$. Without intending to be limiting, the method is most efficient when $m_{up}=m_{down}$, or as close to equal as possible if n is odd.

The process then continues at step 410 by computing D=sum (V1*V2*signs(n)), where $V_1$=F1(H1) and $V_2$=F2 (H2). In this computation, the symbol * is an SIMD element-wise product of the vectors $V_1$, $V_2$ and signs (n), and sum is the sum of the resulting C (n, m) products. D is the scalar that is the determinant of the whole n×n matrix.

The technique of leveraging SIMD processing as described herein enables highly-efficient computation of many determinants together. As noted above, functions F1 and F2 involve the computation of c=C(n,m) determinants of different sub-matrices of size m×m of H. Suppose there are s slots in a SIMD vector. If c≤s, m×m vectors/ciphertexts with n slots in each vector are created, and where the $i^{th}$ slot of the m×m vectors hold the $i^{th}$ sub-matrix, as has been described. The operations of computing the determinants on the m×m vectors are then performed as SIMD operations so that the result is a single vector containing the c determinants. If (k−1) s<c≤kS, k sets of m×m vectors are used, then the above procedure is repeated on the k sets, resulting in k vectors with the output determinants.

Figure 5:
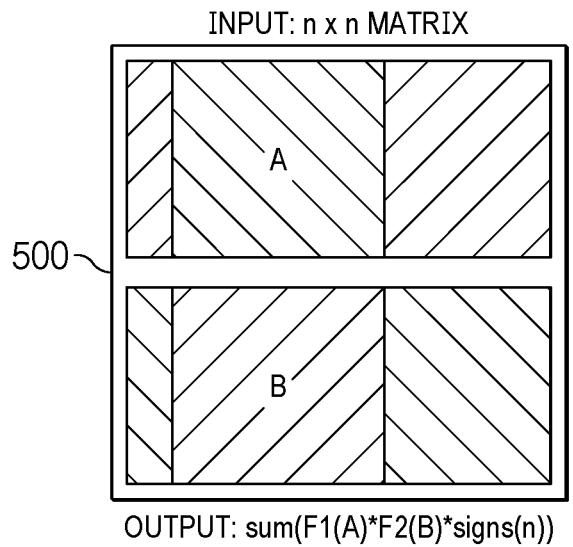
FIG. 5 depicts a SIMD-based determinant computation under FHE for a square matrix.
Figure 6:
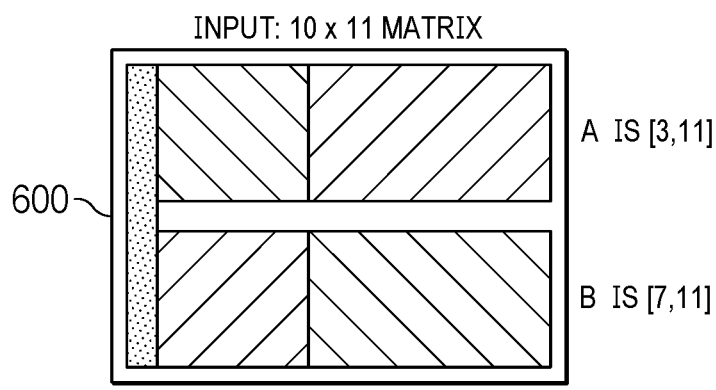
FIG. 6 depicts a SIMD-based determinant computation under FHE for an almost square matrix.

FIG. 5 depicts the high-level process that has been described above for the square matrix 500. This matrix is composed of top half A and bottom half B. On each half the functions F1 and F2 are executed respectively, resulting with the vectors $V_1$ and $V_2$ that are referenced above. As noted above, the technique herein also is useful to compute the determinants of an almost square matrix, e.g., matrix 600 in FIG. 6. This drawing depicts the compute process for a [10,11] matrix, and it is desired to compute eleven (11) determinants of all its [10, 10] sub-matrices. In this example the [10,11] matrix is split to A and B, where A is [3, 11] and B is [7,11]. In particular, and in this illustrative example, applying F1 on A results in a vector $V_1$ of size [11 choose 3] of all 3×3 determinants in A, and applying F2 on B results in a vector $V_2$ of size [11 choose 7] of all 7×7 determinants in B. For i=1:11, the resulting determinant res [i]=sum $(V_1*M_i*V_2*signs (11))$, where $M_i$ is a [11 choose 3, 11 choose 7] matrix mapping values of $V_1$ to selected positions in $V_2$. This is because an element in $V_1$ may need to be multiplied by different elements in $V_2$ when (in this example) computing the 11 different determinants. Also, each of the determinants typically only uses some of the elements of $V_1$. Each $M_i$ includes only 0 and 1 elements and permutes the elements of $V_1$ so as to match them with the corresponding determinants in $V_2$. The matrix $M_i$ also zeroes out elements of $V_1$ that are not used for the computation of res[i].

As mentioned above, the above-described technique is useful to facilitate FHE-based analytics that require matrix determinants. Representative but non-limiting use cases include the solving of a set of linear equations, e.g., using Cramer's Rule. In linear algebra, Cramer's Rule is an explicit formula for the solution of a system of linear equations with as many equations as unknowns, valid whenever the system has a unique solution. It expresses the solution in terms of the determinants of a (square) coefficient matrix and the matrices obtain from it by replacing one column by the column vector of right-sides of the equations. In this use case, it is desired to find a solution under FHE to a set of n linear equations with n variables. In this example, Cramer's Rule is used to compute the solved values of the n variables by computing the determinant D of the matrix M made up of the n×n left-hand-size (LHS) coefficients of the n equations, and the n determinants $D_1$, $D_2$, . . . . $D_n$, where $D_i$ is the determinant of the matrix M where column i was replaced with the right-hand-side (RHS) of the n equations. According to Cramer's Rule, variable $X_i=D_i/D$. In this example use case, the division is computed under FHE by approximately the function 1/D with a polynomial.

Continuing with the example, the n+1 determinants $D_S=\{D, D_1, D_2, \ldots, Dn\}$ needed for Cramer's rule match the n+1 sub-matrices of size n×n of the large rectangular n×(n+1) matrix H, in which the RHS column is placed, e.g. in the first column of H. The situation is the same as explained above in the FIG. 6 description, where the matrix is almost square. Thus, and as discussed above, one approach then is to break up the n×(n+1) matrix H into its upper half H1 and lower half H2, both of size m×(n+1) where m=n/2. Again, F1 is used to compute a vector $V_1$ of C (n+1,m) determinants of H1 and also a vector $V_2$ of C (n+1,m) determinants of H2. Then, similar to FIG. 6, an element in $V_1$ may need to be multiplied by different elements in $V_2$ when computing the different determinants in $D_S$. Also, each of the determinants in $D_S$ typically only uses some of the elements of $V_1$. Thus, preferably a separate plaintext [C (n+1,m), C (n+1,m)] mapping matrix $M_i$ for i=1, . . . n+1 is created for each of the n+1 determinants in $D_S$, where each $M_i$ includes only 0 and 1 elements and permutes the elements of $V_1$ so as to match them with the corresponding determinants in $V_2$. The matrix $M_i$ also zeroes out elements of $V_1$ that are not used for the computation of $D_S$[i]. The $M_i$ matrices can also include the signs needed by the corresponding elements of the determinant. So, for example, if $D_7$ uses $-V_1[2] *V_2[5]$ then $M_7$ permutes $V_1[2]$ to position 5 and negates its sign. As in the primary embodiment, SIMD is then exploited to compute all the c (n+1,m) determinants in $V_1$ or $V_2$ together or in large groups depending on the relative size of the SIMD vector and c(n+1,m).

Solving sets of linear equations as described above is just an example use case that leverages the SIMD-based matrix determinant computation under FHE of this disclosure. Other use cases include FHE-based analytics that leverage matrix inversions. Both of these use-cases occur when performing analytics under FHE, e.g. when modeling an ARIMA time-series or a linear-regression model over encrypted data.

The technique of this disclosure provides the significant advantage of enabling matrix determinants to be computed on encrypted data. Many FHE schemes (e.g., CKKS and BGV) already utilize SIMD, and thus existing FHE-based systems can readily take advantage of the techniques herein by leveraging that existing functionality. The SIMD-based approach herein is computationally-efficient as compared to other known techniques, such as those that compute the determinant of an n×n matrix M by computing determinants of sub-matrices (minors) in a way that avoids re-computing smaller included minors, e.g. by caching small minors at the bottom of the matrix and going recursively up the matrix with ever growing minors. That type of known scheme involves $n*(2^{n-1}-1)$ products as compared with $n*(2^{(n/2-1)}-1)$ product of the subject scheme when c(n,m)≤S, and where the saving comes from the SIMD exploitation, which enable fast computation of the determinants despite the encryption of the data. Further, the approach herein avoids the type of frequent conditional operations that would otherwise be prohibitive for an FHE solution.

Generalizing, the FHE matrix determinant method according to this disclosure may be implemented as a standalone approach, e.g., a software-based function executed by a processor, or it may be available as a managed service (including as a web service via a SOAP/XML interface). The particular hardware and software implementation details described herein are merely for illustrative purposes, and they are not meant to limit the scope of the described subject matter.

More generally, computing devices within the context of the disclosed subject matter are each a data processing system (such as shown in FIG. 1) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As also depicted in FIG. 1, the scheme described herein may be implemented in or in conjunction with various server-side architectures including simple n-tier architectures, web portals, federated systems, and the like. The techniques herein may also be practiced in whole or in part in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk-read/write (CD-R/W) and DVD. The computer-readable medium is a tangible item.

In a representative embodiment, the HE system and the determinant computing code are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the system described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As already mentioned, the techniques disclosed herein are not limited to any particular homomorphic encryption protocol such as CKKS, but this will be a typical implementation. More generally, the approach herein may be implemented in CKKS, any CKKS derivative, or in any similar HE scheme that leverages SIMD to support real values with scaling.

The techniques herein provide for improvements to another technology or technical field, namely, homomorphic inferencing systems, FHE-based analytics, as well as improvements to the operational capabilities of such systems when used in the manner described.

The nature of the data that is subject to the homomorphic inferencing is dependent on the application and is not intended to be limited. Example data types include financial, medical, genomic, measurement data, testing data, and so forth.

Having described the subject matter, what is claimed is as follows.

The invention claimed is:

1. A method of homomorphic computation operating at a server, comprising:
  receiving encrypted data that contains values of a matrix, wherein the encrypted data includes a query;
  separating the matrix into at least a first portion, and a second portion, wherein the first portion is a top number of rows and the second portion is a bottom number of rows of the matrix;
  computing, under Fully Homomorphic Encryption (FHE) and as Single Instruction Multiple Data (SIMD) operations, a first data vector associated with the first portion, and a second data vector associated with the second portion, wherein each element of each respective first and second data vector holds a determinant of a sub-matrix;
  computing a determinant of the matrix using the first and second vectors; and
  returning a response to the query.

2. The method as described in claim 1, wherein the matrix is a square matrix whose values are stored encrypted in ciphertexts.

3. The method as described in claim 2, wherein the determinant of the matrix is computed by:
  parallel-computing determinants of all sub-matrices of each of the first and second portions using multiple ciphertext slots; and ordering determinant results associated with the second portion relative to determinant results associated with the first portion to generate a set of results.

4. The method as described in claim 1, further including performing an FHE-based analytic operation using the determinant of the matrix.

5. The method as described in claim 4 wherein the FHE-based analytic operation is one of: solving a set of linear equations, and generating an inverse of the matrix.

6. The method as described in claim 1 wherein each of the first and second data vectors is associated with a square m×m matrix with a total of n slots, and wherein an $i^{th}$ slot of the respective data vector holds the determinant of an $i^{th}$ sub-matrix.

7. An apparatus, comprising:
a processor;
computer memory holding computer program instructions executed by the processor for homomorphic computation, the computer program instructions comprising program code configured to:
receive encrypted data that contains values of a matrix, wherein the encrypted data includes a query;
separate the matrix into at least a first portion, and a second portion, wherein the first portion is a top number of rows and the second portion is a bottom number of rows of the matrix;
compute, under Fully Homomorphic Encryption (FHE) and as Single Instruction Multiple Data (SIMD) operations, a first data vector associated with the first portion, and a second data vector associated with the second portion, wherein each element of each respective first and second data vector holds a determinant of a sub-matrix; compute a determinant of the matrix using the first and second vectors; and
returning a response to the query.

8. The apparatus as described in claim 7, wherein the matrix is a square matrix whose values are stored encrypted in ciphertexts.

9. The apparatus as described in claim 8, wherein the program code configured to compute the determinant of the matrix includes program code configured to:
parallel-compute determinants of all sub-matrices of each of the first and second portions using multiple ciphertext slots; and
order determinant results associated with the second portion relative to determinant results associated with the first portion to generate a set of results.

10. The apparatus as described in claim 7, wherein the program code is further configured to perform an FHE-based analytic operation using the determinant of the matrix.

11. The apparatus as described in claim 10 wherein the program code configured to perform the FHE-based analytic operation further includes program code configured to solve a set of linear equations or to generate an inverse of the matrix.

12. The apparatus as described in claim 7 wherein each of the first and second data vectors is associated with a square m×m matrix with a total of n slots, and wherein an $i^{th}$ slot of the respective data vector holds the determinant of an $i^{th}$ sub-matrix.

13. A computer program product in a non-transitory computer readable medium, the computer program product holding computer program instructions that, when executed by one or more processors in a host processing system, perform a homomorphic computation, the computer program instructions comprising program code configured to:
receive encrypted data that contains values of a matrix, wherein the encrypted data includes a query;
separate the matrix into at least a first portion, and a second portion, wherein the first portion is a top number of rows and the second portion is a bottom number of rows of the matrix;
compute, under Fully Homomorphic Encryption (FHE) and as Single Instruction Multiple Data (SIMD) operations, a first data vector associated with the first portion, and a second data vector associated with the second portion, wherein each element of each respective first and second data vector holds a determinant of a sub-matrix;
compute a determinant of the matrix using the first and second vectors; and
returning a response to the query.

14. The computer program product as described in claim 13, wherein the matrix is a square matrix whose values are stored encrypted in ciphertexts.

15. The computer program product as described in claim 14, wherein the program code configured to compute the determinant of the matrix includes program code configured to:
parallel-compute determinants of all sub-matrices of each of the first and second portions using multiple ciphertext slots; and
order determinant results associated with the second portion relative to determinant results associated with the first portion to generate a set of results.

16. The computer program product as described in claim 13, wherein the program code is further configured to perform an FHE-based analytic operation using the determinant of the matrix.

17. The computer program product as described in claim 16 wherein the program code configured to perform the FHE-based analytic operation further includes program code configured to solve a set of linear equations or to generate an inverse of the matrix.

18. The computer program product as described in claim 13 wherein each of the first and second data vectors is associated with a square m×m matrix with a total of n slots, and wherein an $i^{th}$ slot of the respective data vector holds the determinant of an $i^{th}$ sub-matrix.

* * * * *